(12) United States Patent
Desai et al.

(10) Patent No.: US 10,509,914 B1
(45) Date of Patent: Dec. 17, 2019

(54) DATA POLICY IMPLEMENTATION IN A TAG-BASED POLICY ARCHITECTURE

(71) Applicant: VMware, Inc., Palo Alto, CA (US)

(72) Inventors: Rohan Desai, Pleasanton, CA (US); Jason A. Lango, Mountain View, CA (US); Vinay Wagh, San Jose, CA (US); Nolan Karpinski, San Francisco, CA (US); Antoine Pourchet, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 168 days.

(21) Appl. No.: 15/796,264

(22) Filed: Oct. 27, 2017

(51) Int. Cl.
*H04L 29/06* (2006.01)
*G06F 21/62* (2013.01)
*H04L 9/08* (2006.01)
*H04L 9/32* (2006.01)
*G06F 16/188* (2019.01)
*G06F 21/60* (2013.01)

(52) U.S. Cl.
CPC ........ *G06F 21/6209* (2013.01); *G06F 16/188* (2019.01); *H04L 9/08* (2013.01); *H04L 9/3213* (2013.01); *G06F 21/602* (2013.01)

(58) Field of Classification Search
CPC ..... G06F 21/6209; G06F 16/188; H04L 9/08; H04L 9/3213
See application file for complete search history.

(56) References Cited

U.S. PATENT DOCUMENTS

| | | | |
|---|---|---|---|
| 9,223,659 B1* | 12/2015 | Natanzon | G06F 11/1456 |
| 9,292,331 B2 | 3/2016 | Lango et al. | |
| 9,306,978 B2 | 4/2016 | Lango et al. | |
| 9,335,932 B2 | 5/2016 | Lango et al. | |
| 9,535,741 B1 | 1/2017 | Lango et al. | |
| 9,578,064 B2 | 2/2017 | Lango et al. | |
| 9,892,265 B1* | 2/2018 | Tripathy | G06F 21/602 |
| 2011/0202916 A1* | 8/2011 | Voba | G06F 21/62 718/1 |
| 2017/0131920 A1* | 5/2017 | Oshins | G06F 3/0613 |
| 2018/0019928 A1* | 1/2018 | Firment | G06F 9/5088 |
| 2018/0212940 A1* | 7/2018 | Novak | H04L 63/061 |
| 2018/0364950 A1* | 12/2018 | Spillane | G06F 16/188 |

FOREIGN PATENT DOCUMENTS

WO  WO-2014151126 A1  9/2014

* cited by examiner

*Primary Examiner* — Mohammad A Siddiqi
(74) *Attorney, Agent, or Firm* — Patterson + Sheridan, LLP

(57) ABSTRACT

A technique implements data policy deployed in a tag-based policy architecture of a virtualized computing environment. Implementation of the data policy may include applying volume tags to data stored on virtualized storage resources, such as disks organized as volumes, based on instances that generate the data, contents of the data, and/or sensitivity of the data. The volume tags may be applied in a cryptographically strong manner to prevent tampering of the tagged data. To that end, the volume tags are cryptographically associated with the data, wherein such association is effected by binding the tags to a data encryption key stored on the volumes (disks) and used to encrypt/decrypt the data stored on the volumes.

20 Claims, 9 Drawing Sheets

DATA POLICY IMPLEMENTATION IN A TAG-BASED POLICY ARCHITECTURE

BACKGROUND

Technical Field

The present disclosure relates to virtualized computing environments and, more specifically, to implementing data policy in a virtualized computing environment.

Background Information

Many enterprises (i.e., customers) utilize virtual machines provided by a virtual data center (VDC) of a virtualized computing environment, wherein the VDC may be a cloud service provider (CSP) deployed as a private or public cloud of computer systems. The CSP may furnish virtualized resources, such as virtualized storage, network and/or compute resources, for instances of virtual machines (virtual machine instances, VMIs), which resources are accessible over a computer network. A VMI may include a guest operating system (OS) and associated applications configured to utilize the virtualized resources, which are managed by a hypervisor of the VMI.

Often, applications running on a customer's cloud environment may generate data that the customer may deem confidential, such as personal credit card information. For typical cloud deployments, there may be unauthorized copying of such confidential data despite protection provided by a security infrastructure of the CSP, i.e., the network level protection generally does not prevent such copying. For example, there is generally no firewall rule or network policy that can prevent copying (snapshotting) and/or cloning of data in a volume that is resident in the CSP within a specific region of the world to another region in the world in violation of a customer requirement/restriction. The confidentiality of such data may also be in jeopardy when resident on an object store system that may inadvertently place the data on the computer network. The customer thus may not reliably depend on the provisions of a typical security infrastructure provided by the CSP for protection of its confidential data. Yet there may be situations where the customer wants to easily and efficiently replicate the applications and data across different regions (and/or CSPs) of the world. Here, the customer may not want to be tied into a single CSP vendor so that it can apply any third party replication solution it desires.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
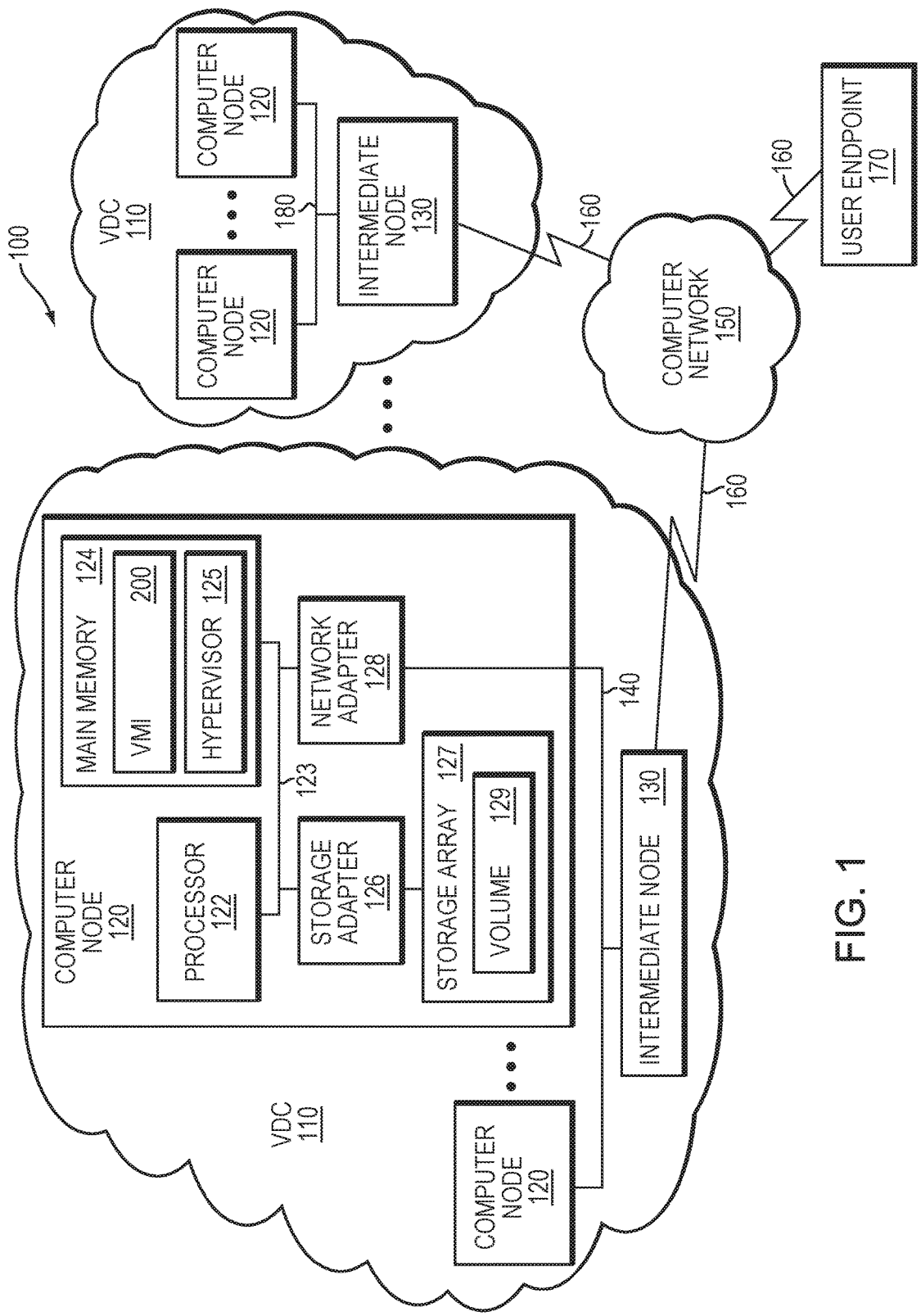
FIG. 1 is a block diagram of a virtualized computing environment.

The embodiments described herein are directed to a technique for implementing data policy deployed in a tag-based policy architecture of a virtualized computing environment. One or more virtual machine instances (VMIs) may be provided by a virtual data center (VDC) of the environment, wherein each VMI includes an intermediary manager, e.g., a meta-hypervisor (metavisor), of a computing cell that also includes a guest operating system (OS) and associated applications. The tag-based policy architecture may be configured to enforce the data policy in the virtualized computing environment using cryptographically-verifiable metadata to authenticate compute resources, such as the VMIs, coupled to a computer network and to authorize access to protected resources, such as virtualized storage resources of the VDC. The tag-based policy architecture may include an infrastructure having a centralized policy decision and enforcement endpoint (e.g., a control plane of the VDC) as well as distributed policy enforcement endpoints (e.g., metavisors of the VMIs) that use end-to-end passing of cryptographically-verifiable metadata to enforce access to the protected resources at the metavisors.

In an embodiment, the data policy may be implemented at the control plane and metavisors to specify the manner in which instances (e.g., metavisors and/or applications of the VMIs) can access data stored on the storage resources (e.g., disks organized as volumes) of the VDC as specified by data access configuration. According to the technique, implementation of the data policy may include applying labels or tags to the data (volumes) based on the instances that generate the data, contents of the data, and/or sensitivity of the data. The control plane provides the applied tags (i.e., volume tags) based on identity (instance) tags of the instances. Once the volumes are tagged, access to the data of the volumes is arranged (brokered) based on the identities of the instances attempting to access the data, as well as policy configured in the control plane.

Illustratively, the volume tags may be applied in a cryptographically strong manner to prevent tampering of the tagged data. To that end, the volume tags are cryptographically associated with the tagged data, wherein such association is effected by binding the tags to a data encryption key stored on the disks and used to encrypt/decrypt the data stored on the volumes. The data encryption key is illustratively itself encrypted (protected) by the control plane using a key encryption key (i.e., an additional encryption key). The control plane employs an authenticated encryption algorithm to encrypt the data encryption key, wherein the authenticated encryption algorithm includes additional authenticated data as an additional data string upon encryption and returns an authentication tag (i.e., a token), such that the data encryption key and the additional data string may be cryptographically verified. That is, during encryption, the authenticated encryption algorithm generates the authentication tag representative of the cryptographic binding of the volume tags to the data encryption key. During decryption, the data string is provided to verify that the data being decrypted is valid. According to the technique, the volume tags are included as the data string of the additional authenticated data (additional data) so that the tags become cryptographically linked (bound) to the data encryption key used to encrypt the data on the volumes. In this manner, the authenticated encryption algorithm securely binds the volume tags to the data encryption key by providing an authentication tag that may be used to verify the integrity of both the data encryption key and the volume tags. Thus, the volume tags and the data encryption key are said to be cryptographically bound. In an embodiment, the additional data (the volume tags) are stored at a label of a volume as open text, since they are cryptographically verifiable using the authentication tag. Cryptographic binding provides an assurance that, in order to gain access to the data, e.g., to decrypt the encrypted data encryption key on disk, the data policy must be satisfied via a policy decision.

In an embodiment, information relating to the storage resources deployed by an administrator of a customer in the virtualized computing environment may be provided to the control plane. Such information may be provided by periodic updates from the metavisors to the control plane organized in a predetermined format and indicating the volumes and their applied tags that are attached to the metavisors. Notably, the updates may be provided in response to one or more requests from the control plane (i.e., metavisor push) and/or provided at periodic intervals by the metavisors (i.e., metavisor poll). According to the technique, the updated information may provide storage resource visibility to the customer administrator. In another embodiment, the technique may be extended to provide policy validation by the control plane, wherein the updated information may be exposed in a graphical format to the administrator so that it can perform such validation. In addition, compliance reports may be generated as another representation of such information in a format visible for analysis by auditors.

DESCRIPTION

FIG. 1 is a block diagram of a virtualized computing environment 100 that includes one or more computer nodes 120 and intermediate nodes 130 illustratively embodied as one or more virtual data centers (VDCs) 110 interconnected by a computer network 150. In some embodiments, the VDCs may be cloud service providers (CSPs) deployed as private clouds or public clouds, such as deployments from Amazon Web Services (AWS), Google Cloud Services, Microsoft Azure, or VMWare vCloud. Each VDC 110 may be configured to provide virtualized resources, such as virtual storage, network, and/or compute resources for one or more instances of virtual machines (virtual machine instances, VMIs), which resources are accessible over the computer network 150, such as the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information (e.g., data) stored on magnetic/solid state storage devices (e.g., disks or other similar persistent media) of storage array 127 organized as storage (e.g., data and metadata) repositories of volumes 129 (e.g., root and/or data volumes), files, images, and/or objects embodied as data and/or object stores. To that end, the storage adapter 126 may include input/output (I/O) interface circuitry that couples to the disks over an I/O interconnect arrangement, such as a conventional serial ATA (SATA) topology.

The network adapter 128 connects the computer node 120 to other computer nodes 120 of the VDC 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, or virtual private network (VPN) gateway that interconnects the LAN/VLAN local segments with remote network segments 160 illustratively embodied as point-to-point links, wide area networks (WANs), and/or VPNs implemented over a public network (such as the Internet) and connect user endpoints 170 embodied as other computer nodes. Communication over the network segments 140, 160 may be effected by exchanging discrete frames or packets of data according to predefined protocols, such as the Transmission Control Protocol/Internet Protocol (TCP/IP) and the OpenID Connect (OIDC) protocol, although other protocols, such as the User Datagram Protocol (UDP) or the HyperText Transfer Protocol Secure (HTTPS) may also be advantageously employed.

The main memory 124 of each computer node 120 includes a plurality of memory locations addressable by the processor 122 and/or adapters for storing software code (e.g., processes and/or services) and data structures associated with the embodiments described herein. Each processor and adapter may, in turn, include processing elements and/or circuitry configured to execute the software code, such as a VMI 200 and a hypervisor 125, and manipulate the data structures. The VMI 200 may be managed by the hypervisor 125, which is a virtualization platform configured to mask low-level hardware operations from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein.

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., application, programs stored in memory, alternative embodiments also include the code, processes and programs being embodied as logic, components, and/or modules consisting of hardware, software, firmware, or combinations thereof.

Figure 2:
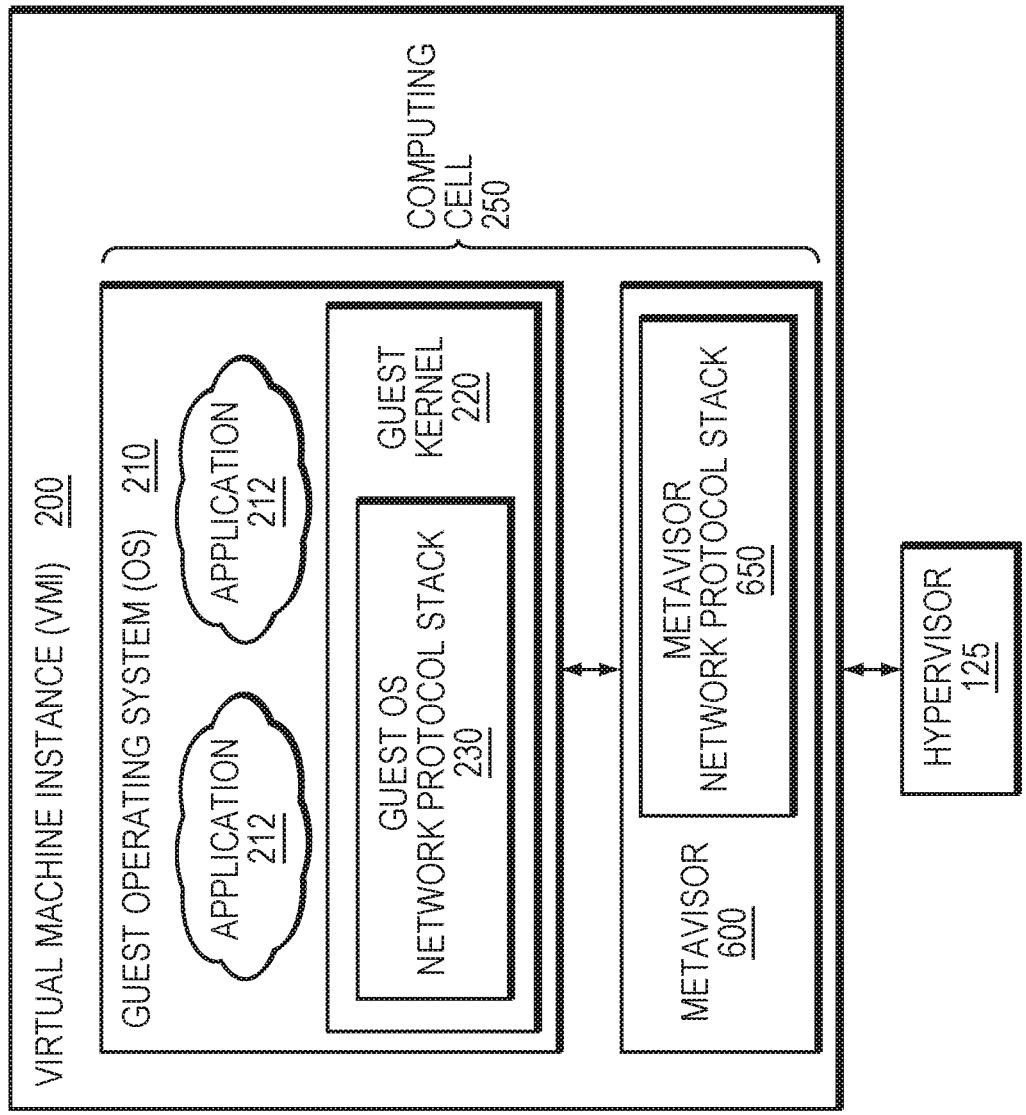
FIG. 2 is a block diagram of a virtual machine instance including a metavisor.

FIG. 2 is a block diagram of the virtual machine instance (VMI) 200. In an embodiment, guest operating system (OS) 210 and associated applications 212 may run in the VMI 200 and may be configured to utilize system (e.g., hardware) resources of the VDC 110. The guest OS 210 may be the Linux operating system, FreeBSD and similar operating systems; however, it should be noted that other types of guest OSs, such as the Microsoft Windows operating system, may be used in accordance with the embodiments described herein. A guest kernel 220 of the guest OS 210 includes a guest OS network protocol stack 230 for exchanging network traffic over a data path of the network established by the network adapter 128 via the hypervisor 125. The guest OS may be managed, at least in part, by an intermediary manager, i.e., metavisor 600, which includes a metavisor network protocol stack 650 and logic for enhancing guest utilization of various VDC resources, such as processor 122, main memory 124, storage adapter 126, and network adapter 128, among others. The VDC resources may be virtualized for the VMI 200, at least partially with the assistance of the hypervisor 125, for use by enterprises, i.e., customers. The hypervisor may present a software interface for processes within the VMI to communicate requests, e.g., hypercalls, directed to the hypervisor to access the VDC resources.

In one or more embodiments, the metavisor 600 and guest OS 210 are independent operating entities (OE) arranged as a computing cell 250 within the VMI 200. The computing cell 250 is illustratively a cloud workload protection platform configured to enable the customers to run workloads securely in hybrid cloud environments using a set of security controls, policies, application and data micro-segmentation (e.g., fine grain control per computing cell), and visibility. The metavisor 600 may be deployed by a customer at a confluence of the computing cell 250 and may include logic that enables implementation and enforcement of the security controls, policies and services for the cell 250 on behalf of the customer. The computing cell 250 is layered over the hypervisor 125 which manages system (e.g., hardware) resources of the VDC. The metavisor 600 illustratively employs an advanced virtualization technique that presents itself to the guest OS 210 as the cloud hypervisor 125, and to the cloud hypervisor 125 as the guest OS 210. That is, the metavisor operates as a transparent intermediary between the guest OS and the cloud hypervisor.

Figure 3:
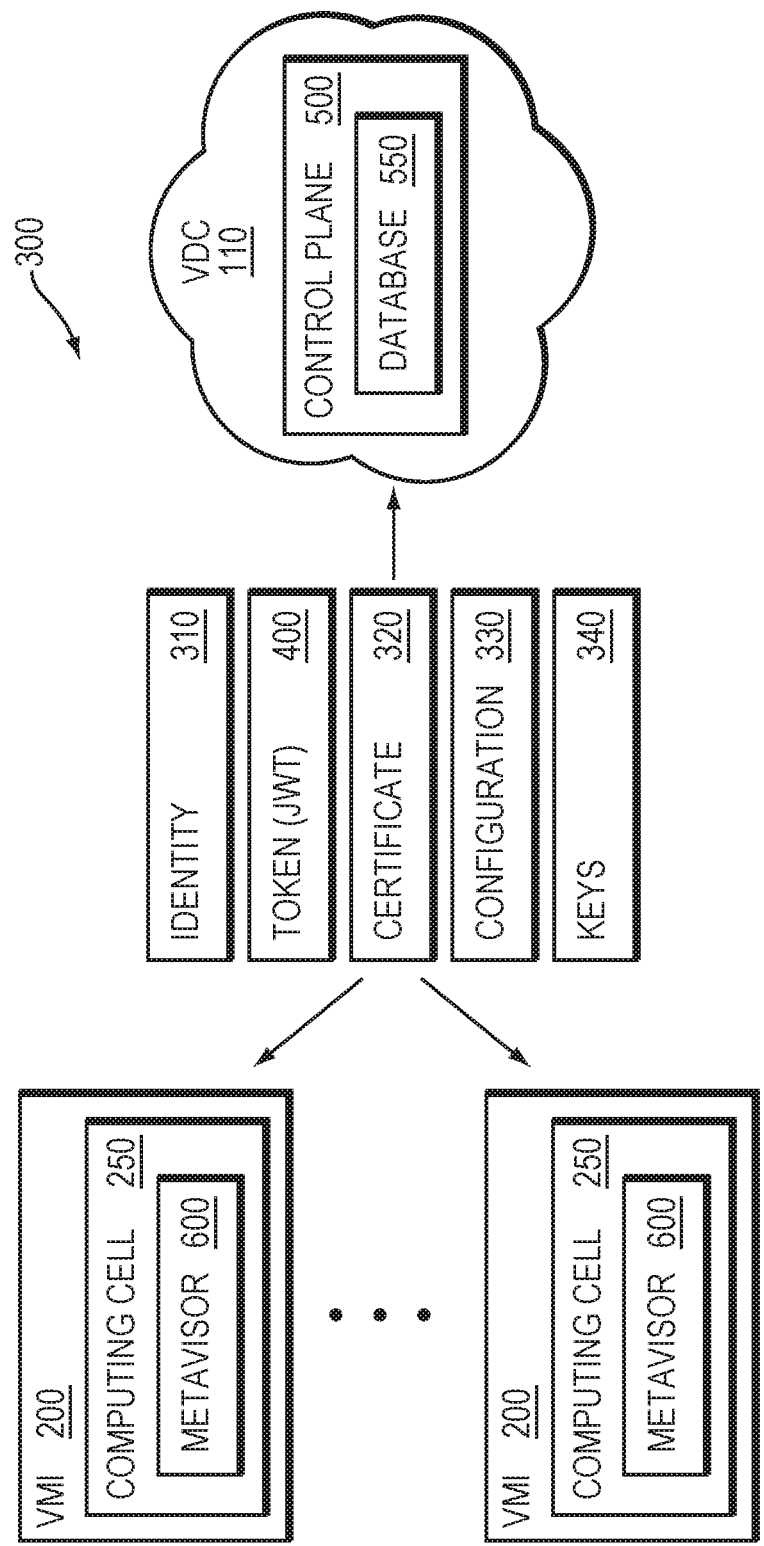
FIG. 3 is a block diagram of a tag-based policy architecture.

The embodiments described herein are directed to a technique for implementing data policy deployed in a tag-based policy architecture of a virtualized computing environment. The tag-based policy architecture may be configured to enforce information technology (IT), e.g., data policy, in the virtualized computing environment using cryptographically-verifiable metadata to authenticate compute resources, such as the VMIs, coupled to a computer network and to authorize access to protected resources, such as virtualized storage resources (e.g., services) of the VDC. FIG. 3 is a block diagram of the tag-based policy architecture 300 that includes an infrastructure having a centralized policy decision and enforcement endpoint (e.g., a control plane 500 of the VDC 110) and distributed policy enforcement endpoints (e.g., metavisors 600 of the VMIs 200) that use end-to-end passing of the cryptographically-verifiable metadata to authorize instantiation of the VMIs 200 at the control plane 500, and enforce access to the virtualized resources at the metavisors 600. To that end, the cryptographically-verifiable metadata may be embodied as tokens 400 and identity documents 310 used to authenticate the VMIs, as well as network certificates 320, configuration 330, and keys 340 used to authorize access to the virtualized (e.g., protected) resources. Note that the cryptographically-verifiable metadata itself may be encrypted to ensure secure transmission of the keys (i.e., secrets). That is, two separate forms of cryptography may be employed: a first cypher to authenticate the metadata and second cypher to render the metadata private during transmission. In an embodiment, the second cypher may be applied via a Transport Layer Security (TLS) protocol.

The identity document 310 is illustratively a JSON file (e.g., an Amazon Web Services instance identity file) that contains metadata describing a VMI (including a metavisor) as provided by a CSP, such as a network address of the metavisor and a geographical region in which the metavisor is allowed to boot. The JSON file may be cryptographically verifiable using CSP provided keys. The metavisor sends the JSON file and a cryptographically-verifiable token 400 to the control plane for authentication, e.g., via a secure (encrypted) connection request. The network certificate 320 is issued by the control plane 500 in response to verifying the identity of a metavisor 600 of an authenticated VMI (i.e., an authenticated metavisor of the VMI) running in the VDC 110 according to the IT policy included in the token. That is, the control plane 500 renders a policy decision whether to permit the metavisor to boot by authenticating the VMI and the metavisor as well as by applying the IT policy. The network certificate illustratively contains the token 400 embedded as an extension that is used to render a distributed IT policy enforcement determination at the metavisor. Note that the control plane 500 authenticates the VMI by verifying the JSON file using the CSP key and further authenticates the metavisor 600 by verifying the token 400. One or more authenticated metavisors running in the VDC may be associated with an IT policy (e.g., data policy) according to a data access configuration 330 provided to each metavisor.

Figure 4:
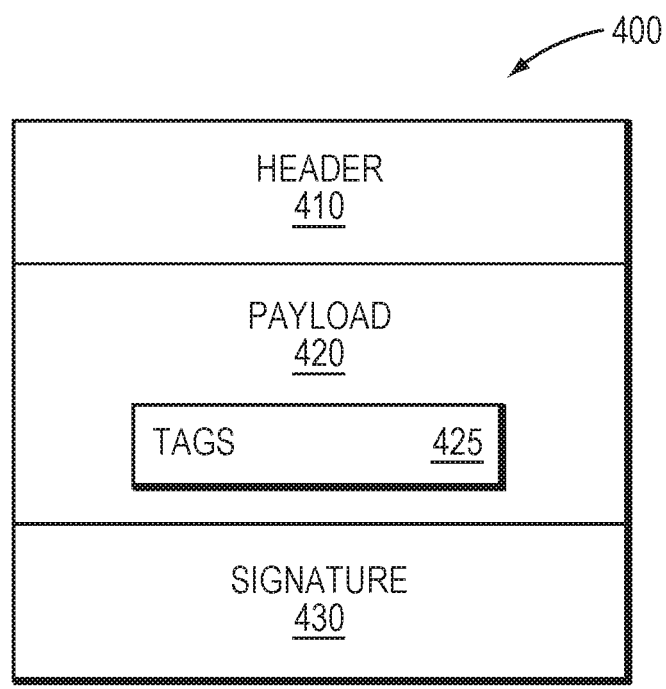
FIG. 4 is a block diagram of a token data structure.

In one or more embodiments, the token 400 is a JSON web token (JWT) data structure (according to Internet Engineering Task Force RFC 7519) that is supplied to a metavisor (i.e., an instance) upon boot. FIG. 4 is a block diagram of a JWT token 400 that includes a header 410, a payload 420, and a signature 430. The header 410 contains metadata about the token 400, such as a key identifier used for verification and a signature algorithm (e.g., an asymmetric encryption algorithm) used to sign the token. A private key of an asymmetric public/private key pair may be used to sign the JWT token 400 at the metavisor 600 and the associated public key of the key pair may be used to authenticate the JWT signature at the control plane 500, e.g., in accordance with the secure connection request. One or more arbitrary key-value pairs (i.e., tags 425) may be embedded within the payload 420 of the token 400 as one or more private claims that enable attachment of IT policy (e.g., a level of access) to a virtualized resource, such as the metavisor, or groups of virtualized resources. The signature 430 authenticates the contents of header 410 and payload 420, which may be verified by applying the signature algorithm. Notably, the JWT may be created by an administrator at the control plane.

Figure 5:
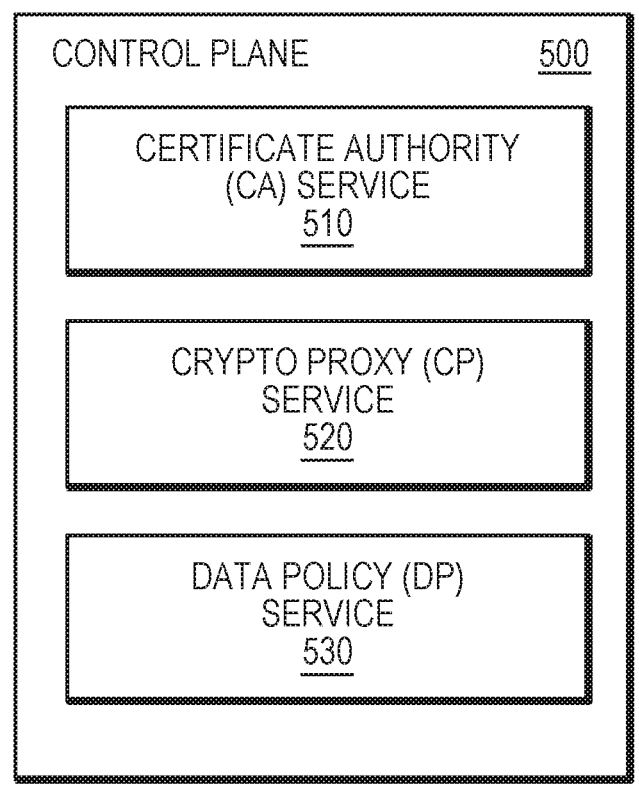
FIG. 5 is a block diagram of a control plane.

In accordance with the centralized/distributed policy infrastructure of the tag-based policy architecture 300, the control plane 500 may perform a centralized policy decision determination for the secure connection request (such as a volume mount request for a volume attached to a node or a network attached storage mount request via, e.g., a Common Internet File System protocol over TCP/IP) by one or more compute resources, such as metavisors 600 and user endpoints 170, to access protected resources, while the control plane, as well as each metavisor, may perform a distributed policy enforcement determination for the connection request to access the protected resources. FIG. 5 is a block diagram of the control plane 500 having various components embodied as services configured to perform the centralized policy determination, wherein the services include a certificate authority (CA) service 510, a crypto proxy (CP) service 520, and a data policy (DP) service 530. The CA 510 is configured to receive a certificate signing request (CSR) from a metavisor 600 and, upon authentication, return a network certificate 320 to the authenticated metavisor. Accordingly, the CSR/network certificate request/reply communication provides a polling mechanism for the metavisor to obtain IT policy, e.g., via the embedded tags in the token extending the certificate. The CP 520 is configured to encrypt/decrypt encryption keys, such as a data encryption key provided by a metavisor, using an authenticated encryption algorithm as described herein. The DP 530 is configured to manage data access policies and process tagging requests pertaining to data access to volumes attached to instances of the VDC.

The control plane 500 may run in an instance of a virtual machine (such as, e.g., a VMI 200) as an OE module in a memory (such as, e.g., main memory 124) and is executable by a processor (such as, e.g., processor 122) of a computer node on a network that is accessible to the metavisor 600. As such, the metavisor may be provided a network address to connect with the control plane when instantiated (launched). In one or more embodiments, residence of the control plane may be on a network segment of the VDC 110 (e.g., a CSP) or of a private customer cloud. For example, the control plane may be deployed on-premises where a customer runs the control plane locally in its own data center (on its premises), typically on a virtual machine instance (or directly on the hardware). Alternatively, the control plane 500 may be deployed as a hosted solution via a service running on a public cloud of the CSP. Access to the control plane may be achieved via standard TLS or secure sockets layer (SSL) protocols and custom client search for metavisor access. Cryptographically-verifiable and secure control plane/metavisor interaction may illustratively use public/private key exchange.

Figure 6:
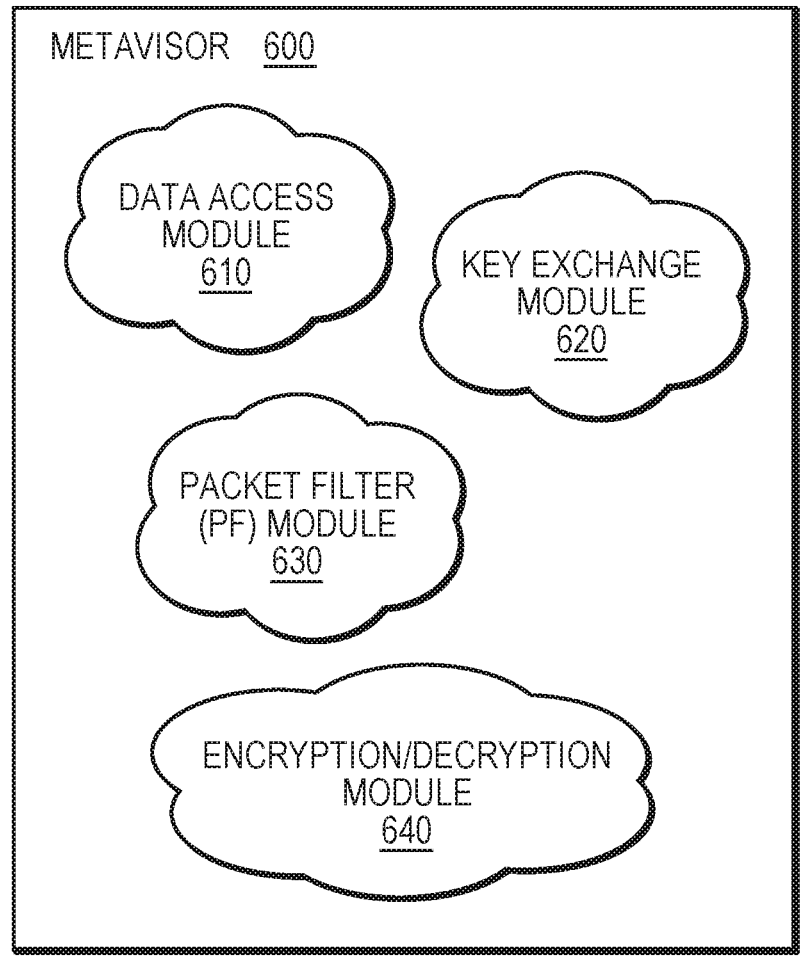
FIG. 6 is a block diagram of the metavisor.

FIG. 6 is block diagram of the metavisor 600 having various components embodied as modules configured to perform the distributed policy enforcement determination. In one or more embodiments, the metavisor 600 is implemented using the NetBSD OS kernel, although other kernels, such as the FreeBSD OS kernel, may also be used. Illustratively, the modules of the metavisor 600 include a data access module 610, a key exchange module 620, a packet filter (PF) module 630, and an encryption/decryption module 640. The data access module 610 is responsible for managing the data access configuration 330 within the metavisor. The key exchange module 620 is responsible for authenticating other metavisors and establishing security associations with them for the purpose of, e.g., encrypting network traffic. The PF module 630 is a kernel process configured to implement firewall functionality, whereas the encryption/decryption module 640 is responsible for encrypting and decrypting network traffic. Illustratively, one or more of these modules may be configured to provide unique, special-purpose conditional tests and actions that are deployed using "hooks" in the metavisor network protocol stack 650 and which are called at particular points of processing in the metavisor 600.

In one or more embodiments, the identity documents 310, cryptographically-signed JWT tokens 400 and embedded tags 425 may be used to create the various IT policies at a computer node such as, e.g., the user endpoint 170. The various IT policies, such as data policy, may then be stored in a repository (e.g., database 550) of the control plane 500. The control plane 500 processes (i.e., compares) the tags 425 of the authenticated JWTs 400 and the authenticated identity documents with its stored data policy to permit release of keys 340 to the metavisor for secure cryptographic operations (e.g., cryptographically secure access to data/storage services). Illustratively, the released keys may be transmitted within a secure (encrypted) connection response (e.g., TLS 1.2), although such keys may alternatively be transmitted via an encrypted JWT. Access to the virtualized resources may then be enforced at the metavisor 600 in accordance with the data policy associated with the JWT tags 425.

In an embodiment, the data policy may be implemented at the control plane 500 and metavisors 600 to specify the manner in which instances (e.g., the metavisors, guest OS, and/or applications of the VMIs) can access (read and/or write) data stored on the storage resources (e.g., disks organized as volumes 129) of the VDC as specified by the data access configuration 330. For data policy, the keys 340 released may include data encryption/decryption keys to enable the metavisors to encrypt (wrap/encapsulate) or decrypt (unwrap/unencapsulate) data of the volumes. Illustratively, a metavisor 600 may utilize the keys to encrypt or decrypt the volumes 129, such as a root volume, on any CSP platform to thereby obviate control of the keys and data by the platform. That is, the metavisor automates management of the keys (via interaction with the control plane 500) independently of the CSP platform. The released keys enable the metavisor to provide fine-grain control with respect to rendering of decisions locally as to whether instances such as, e.g., the guest OS 210 and associated applications 212, can access (i.e., read, read and write, or delete) the contents of a volume. These fine-grain control decisions may be rendered at the metavisor as a point of enforcement.

Illustratively, a policy engine of the control plane may be embodied as database web application configured to store the data policy as defined by an administrator interacting with the web application, wherein the stored policy may be based, at least in part, on the identity document 310 and tags 425 contained in associated JWT 400. According to the technique, implementation of the data policy may include applying labels or tags to the data (volumes) based on the identity of the instances that generate the data, contents of the data, and/or sensitivity of the data. Tagging illustratively involves labeling of the data in a meaningful way so that data policy may be applied as volume tags to determine whether an instance has permission to access the data of a volume. Tags may be generated using default tagging, wherein the data may be tagged by establishing a data policy that applies the volume tags based on the instances that generate the data to be tagged, instead of relying on a creator of the data to tag the data/storage resource.

For example, assume an administrator of a customer configures a data policy that specifies "if an instance is tagged as a database application that runs in the west coast of the US and is in production, then apply a tag that labels data generated by the application as payment card industry (PCI) data". A volume attached to such an instance (e.g., a metavisor or, illustratively, an application of a guest OS) may be labeled with a volume tag that indicates that the PCI data is generated in the US west coast only and is a production application. The technique allows customer administrators to configure (via, e.g., the policy engine of the control plane) a policy that intelligently tags data as the storage resources are generated and attached to the metavisors/applications that use the data/resources. The configured policy may generate volume tags for the data that are applied as defaults, i.e., default tagging. Note that a geographic region aspect of default tagging ("for west coast only") may be enforced locally by the metavisor associated with the instance and thus may not require separate enforcement by the control plane, i.e., geographical tags may be applied separately to storage resources as arbitrary tags.

Since the metavisor resides on the data path, storage resources, such as volumes 129, may be tagged for data policy. Assume an application is PCI-compliant, such that volumes are tagged with "PCI" using the tags (e.g., volume tags 425) of the JWT token 400 so as to permit access via the VMI. The data policy (as specified by the data access configuration 330) may allow any application tagged "PCI" to read (and optionally write) PCI data of the volumes 129. Such data policy provides fine-grained read/write control based on embedded policy tags of the JWT in conjunction with the control plane 500 providing the data access configuration 330 to the metavisor 600 and releasing the keys 340 needed to decrypt (and optionally encrypt) the data of the volumes. The metavisor thereafter enforces the data access configuration 330 including use of the keys 340 when appropriate.

Figure 7:
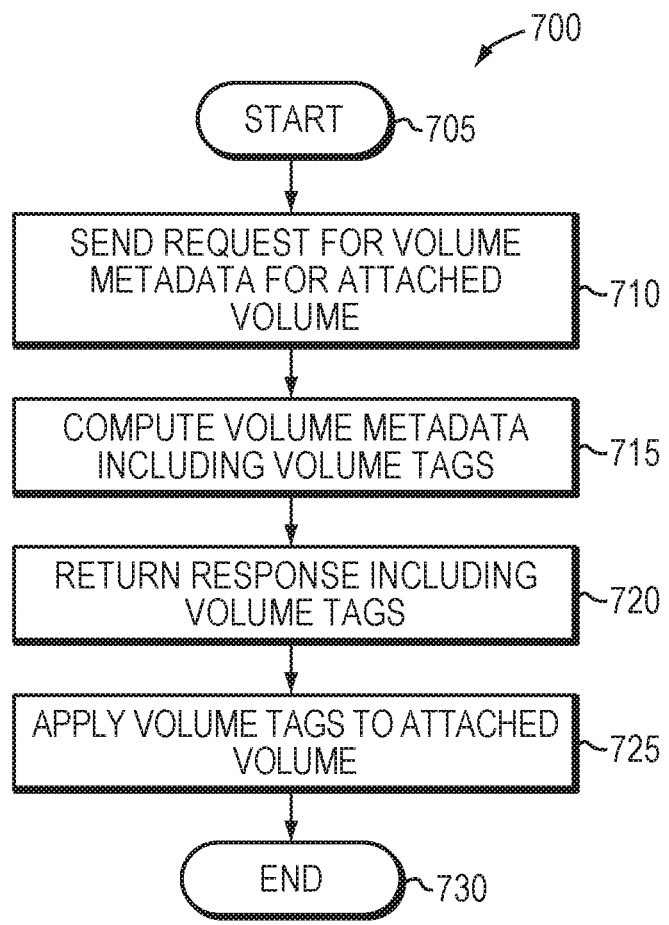
FIG. 7 is an example simplified procedure for determining volume tags to apply to an attached volume.

FIG. 7 is an example simplified procedure for determining volume tags to apply to an attached volume. Assume the volume is attached to an instance, such as a metavisor. The procedure 700 starts at box 705 and proceeds to box 710 where, upon instantiation, the metavisor sends a request (e.g., an HTTPS volume metadata request) to the data policy service of the control plane for volume metadata for the attached volume, wherein the request includes a certificate with an extension containing a JWT token with a payload containing identity (instance) tags of the metavisor embodied as key-value pairs. At box, 715, the data policy service processes the token and instance tags of the certificate with the stored data policy to compute the volume metadata for the attached volume, wherein the volume metadata includes a set of default tags (i.e., volume tags) to apply to the attached volume. At box 720, the data policy service of the control plane responds to the request by returning a volume metadata response that includes the volume tags for the metavisor to apply to the volume. Illustratively, the response from the control plane includes the JWT token, wherein the payload of the JWT token contains the volume tags embodied as key-value pairs. Note, however, that the response token is not signed (i.e., not cryptographically verifiable). Upon receiving the response, the metavisor applies the volume tags to the attached volume at box 725 by, e.g., writing the volume metadata to a predetermined location on disk/volume in a secure manner. Note also that the volume tags may not be initially cryptographically verifiable and, as such, a second request to the control plane may be sent to enable application of the volume tags to the attached volume in the secure manner (as described in FIG. 8). The procedure then ends at box 730.

According to the technique, the volume tags may be applied in the secure manner that is cryptographically strong to prevent tampering (or unauthorized access) of the tagged data. To that end, the volume tags are cryptographically associated with the tagged data, wherein such association is effected by binding the tags to a data encryption key generated by the metavisor and used to encrypt/decrypt the data stored on the volumes. In an embodiment, the encryption algorithm used to generate the data encryption key and encrypt/decrypt the volume data is AES encryption with ciphertext stealing (XTS) mode chaining (e.g., IEEE Cipher standard P1619). The data encryption key may be stored on the disk at the predetermined location (e.g., a volume label of the disk) and is itself encrypted for protection, e.g., from unauthorized access or modification. The predetermined location of the volume label is illustratively the first 32 megabytes on disk reserved for the volume metadata which describes, among other things, the format of the volume.

In an embodiment, the data encryption key is illustratively itself encrypted (i.e., protected) by the control plane using a key encryption key (i.e., an additional encryption key). The control plane employs an authenticated encryption algorithm (e.g., AES-GCM chaining mode) to encrypt the data encryption key, wherein the authenticated encryption algorithm includes additional authenticated data as an additional data string upon encryption (i.e., a data string that is cryptographically verified by the encryption key). During decryption, the data string is provided to verify that the data being decrypted is valid. According to the technique, the volume tags are included as the data string of the additional authenticated data (additional data) so that the tags become cryptographically linked (bound) to the data encryption key used to encrypt the data on the volumes. In this manner, the authenticated encryption algorithm securely binds the volume tags to the data encryption key by providing an authentication tag that may be used to verify the integrity of both the data encryption key and the volume tags. Thus, the volume tags and the data encryption key are said to be cryptographically bound. In an embodiment, the additional data (the volume tags) are stored at a label of a volume as open text, since they are cryptographically verifiable using the authentication tag. Cryptographic binding provides assurance that, in order to gain access to the data, e.g., to decrypt the data encryption key on disk, the data policy must be satisfied via a policy decision. That is, the additional data provides a policy enforcement mechanism for using the encryption key at the metavisor.

Figure 8:
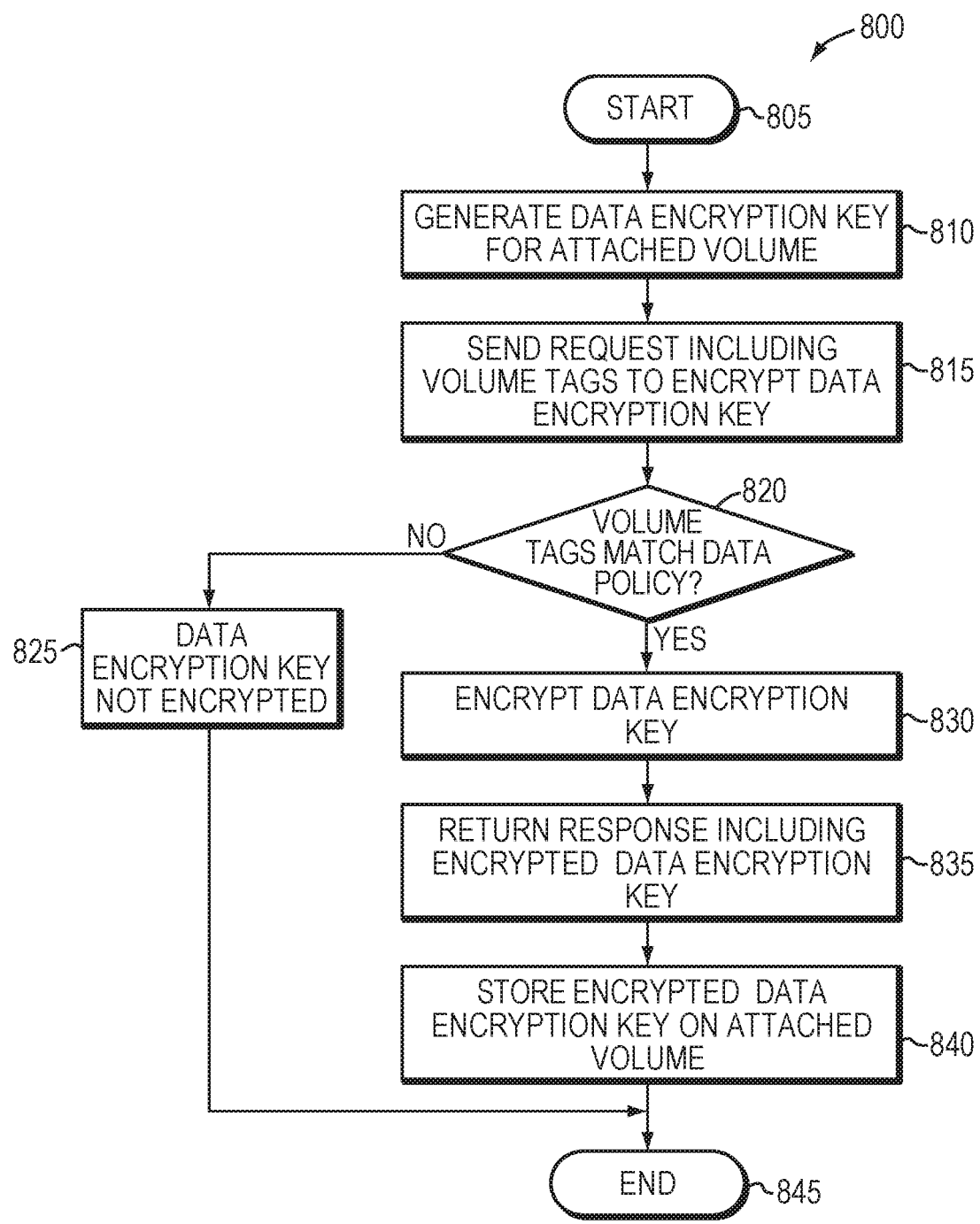
FIG. 8 is an example simplified procedure for securely applying the volume tags to the attached volume.

FIG. 8 is an example simplified procedure for securely applying the volume tags to the attached volume. The procedure 800 starts at box 805 and proceeds to box 810 where, upon adding a volume under policy control, the metavisor generates a data encryption key for the attached volume and, at box 815, sends a request (e.g., a key encryption request) to the control plane to encrypt the data encryption key, wherein the request includes the volume tags as (at least part of) the additional data. In an embodiment, the metavisor sends the request to the crypto proxy service of the control plane, which service cooperates with the data policy service to verify that the volume tags match the tags that should be applied to the attached volume based on a tagging aspect of the data policy configured for the attached volume (box 820). If the volume tags do not match the data policy, the data encryption key is not encrypted at box 825 and the procedure ends at box 845. However if the volume tags match the data policy, the crypto proxy service encrypts the data encryption key at box 830 using, e.g., the authenticated encryption algorithm that cryptographically binds the volume tags to the data encryption key as e.g., an authentication tag. Illustratively, the data encryption key and the additional data (i.e., volume tags) are provided as input information to the authenticated encryption algorithm, which performs a cryptographic operation on the information to generate (output) the authentication tag and an encrypted data encryption key. At box 835, the crypto proxy service sends (returns) a response (e.g., a key encryption response) to the metavisor, wherein the response includes the encrypted data encryption key as well as the authentication tag and the additional data. Upon receipt, the metavisor applies the volume tags to the attached volume in a secure manner by storing the encrypted data encryption key, the additional data (volume tags) and the authentication tag on the attached disk/volume (e.g., writing the encrypted key 920, the authentication tag 922, and the additional data 924/volume tags 425 onto the volume label 910 of the attached volume 129) at box 840 and the procedure ends at box 845. Notably, the volume tags may be stored as open text, since they are cryptographically verifiable.

Once the volumes are tagged, access to the data of the volumes is arranged (brokered) based on the identities of the instances attempting to access the data, as well as the data policy configured in the control plane. For example, assume the metavisor 600 attaches the encrypted data encryption key in the guest OS 210 for operation on the encrypted disk. In order to access the data on the tagged volume, the stored encrypted data encryption key must be decrypted. The decision of whether to decrypt the encrypted data encryption key and provide (release) the decrypted key to the metavisor is rendered by the control plane (i.e., crypto proxy service 540 and the data policy service 550), and release of the decryption key is only performed if allowed by an access aspect of the data policy. As such, this represents data policy enforcement of the tagged-based policy architecture as applied to data access, i.e., policy is enforced based on key release by the control plane 500.

Figure 9:
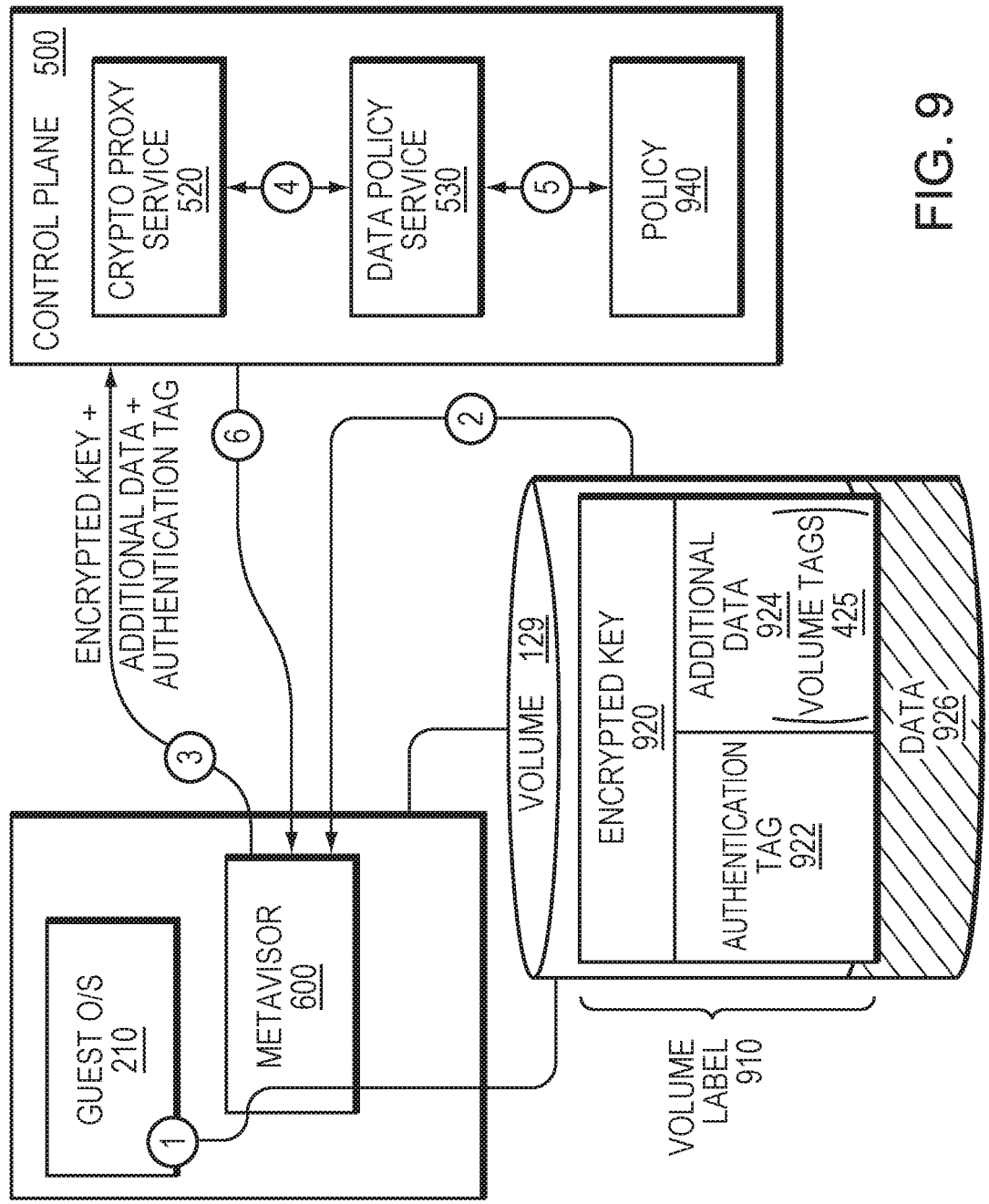
FIG. 9 is block diagram of the tag-based policy architecture applied to data access.

FIG. 9 is block diagram of the tag-based policy architecture applied to data access. Illustratively, the metavisor is positioned in the data path of the network to enable volume attachment and access to data blocks (data 926) of the attached volume 129. Assume the guest OS 210 attempts to mount (attach) the disk/volume 129. The metavisor intercepts the attempt (denoted as circled "1") and renders a decision as to whether to attach the volume in the guest OS. In order for the guest OS to access the volume, the metavisor 600 needs to decrypt the stored encryption key used to access the data on the volume. To that end, the metavisor retrieves the encrypted data encryption key (encrypted key 920) from the volume 129 (denoted as circled "2") and sends a request (e.g., a key decryption request) to the control plane 500 to decrypt the encrypted key (denoted as circled "3"). Since AES-GCM is used to encrypt/decrypt the key, the metavisor passes the encrypted key 920 as well as the additional data 924 (containing the volume tags 425 bound to the data encryption key) and the authentication tag 922 (in addition to other information such as instance tags of a requesting instance, e.g., the guest OS) to the control plane 500 as part of the request.

At the control plane, the crypto proxy service 520 decrypts the encrypted data encryption key only if the instance requesting access to the data (i.e., the guest OS 210) is permitted (by the access aspect of the data policy 940) to access the data. As noted, without a decrypted key, the guest OS 210 cannot read/write data to the volume. The crypto proxy service 520 determines whether there has been any tampering of the data and/or volume tags by, e.g., providing the encrypted data encryption key, the additional data (i.e., volume tags) and the authentication tag as input information to the authenticated encryption algorithm, which performs a reverse cryptographic operation on the information, as well as a check that the authentication tag is valid, to determine (as an output) any tampering of the data and/or volume tags. If there has not been any such tampering, the crypto proxy service 520 determines whether the tags comport with (satisfy) the data policy 940 by, e.g., issuing a call to the data policy service 530 (denoted as circled "4"), which service examines the access aspect of the data policy 940 to determine whether the volume tags and instance tags match the policy, i.e., verify that the requesting instance associated with the instance tags can access the volume associated with the volume tags (denoted as circled "5"). If so, the requesting instance (guest OS 210) is permitted to access the data and, as such, the crypto proxy service 520 decrypts the encrypted key 920 and returns the decrypted key to the metavisor (denoted as circled "6"). The metavisor 600 may then attach the disk/volume 129 into the guest OS 210 by, e.g., allowing the hypervisor 125 to make the virtualized storage resource available to the guest OS. The metavisor may render additional enforcement decisions (if so desired by a customer) that, e.g., attaches the volume/disk as read-only to prevent the guest OS 210 from writing to the volume 129, or enforce data policy 940 that allows read access to data, but not write access to that data.

The technique described herein also includes the notion of data classification such as, e.g., a hierarchical data classification system, applied to the data/resources (volumes 129). Assume a classification system has multiple levels 1-3, wherein an instance that is granted access to data at a particular level may access the data at that level and lower, e.g., an instance granted access to level 2 data may access both level 2 and level 3 data. A customer administrator may be allowed to establish data policy that specifies such levels of hierarchy to its data. The actual level classifications may manifest as semantics controlled by the administrator, i.e., the technique provides a special volume tag construct that may attach to a volume and that has a hierarchical structure that enables the administrator to assign names to the data levels in a meaningful way. In other words, the administrator may assign semantics to particular categories of data, e.g., highly confidential data having personal information may be assigned a high-privileged label, e.g., "red," that bears the associated semantics. The administrator may classify all its data into various levels of categories such as "red" (high-privileged) "blue" (medium-privileged) and "green" (low-privileged), but semantically a hierarchy of nested access permission is implied, e.g., an instance with access to "red" data may implicitly also have access to the lower level "blue" and "green" data.

In an embodiment, the volume tags attached to a volume may be changed. Assume a volume 129 originally tagged as medium-privileged "blue" data is detached and reattached to an instance tagged as high-privileged "red". "Red" data may then be generated for storage on a "blue" volume that it is now desired to reclassify to "red". However, the encryption key 920 stored on the volume 129 may have been used to encrypt the "blue" data previously stored on the volume. Therefore, the stored encryption key may be changed (i.e., upgraded) and used to (re-)encrypt new data subsequently written to the volume. According to the technique, re-encryption of the new data is dependent upon the manner in which the data is encrypted on the volume 129. For example, if GCM mode (Galois counter mode of a cipher, such as AES, for authenticating information) encryption is employed for the volume, each data block on the volume (disk) includes metadata that enables the block to be labeled according to the encryption key 920 used to encrypt the data block. That is, for a volume that is re-encrypted according to an authenticating cipher, e.g., GCM mode, the technique enables encryption of new data blocks using a new encryption key which is tagged (labeled) in the metadata of the blocks. This obviates the need to re-encrypt the data stored on the volume 129, since a "blue" key is unable to decrypt data encrypted with a "red" key. Note that with XTS there is no block level metadata so there can only be one key used to encrypt the disk. Since GCM has block-level metadata, data can be rekeyed at the block level (or stripe level) with a different key as opposed to rekeying of the entire volume.

In an embodiment, the technique described herein may maintain a key ring with AES-GCM encryption, where new write requests are written using a new key. In the key upgrade example above, subsequent write requests may use the new (red) key that is not accessible to a lower-privileged key used by a lower-privileged instance (e.g., a blue key). If the previous data on disk/volume 129 is encrypted with the blue key and new data from subsequent write requests are encrypted with the red key, the blue key can only be used to access previously-encrypted blue data, whereas the red key can be used to access both the blue and red encrypted data.

In an embodiment, information relating to the storage resources deployed by an administrator of a customer in the virtualized computing environment may be provided to the control plane 500. Such information may be provided by periodic updates from the metavisors 600 to the control plane organized in a predetermined format and indicating the volumes 129 and their applied tags that are attached to the metavisors. Notably, the updates may be provided in response to one or more requests from the control plane (i.e., metavisor push) and/or provided at periodic intervals by the metavisors (i.e., metavisor poll). According to the technique, the updated information may provide storage resource visibility to the customer administrator. In another embodiment, the technique may be extended to provide policy validation by the control plane 500, wherein the updated information may be exposed in a graphical format to the administrator so that it can perform such validation. In addition, compliance reports may be generated as another representation of such information in a format visible for analysis by auditors.

For example, an auditor may request proof that a customer's customer relationship management (CRM) application conforms to PCI regulations. Through a user interface (UI) of the control plane 500, a customer administrator may request a compliance report of all instances and resources tagged PCI and CRM, and a report may be generated that shows (1) data/storage resources (i.e., instances authorized to access volumes), (2) network resources (i.e., instances authorized to communicate with each other) and (3) regional resources (i.e., deployment of the instances/storage resources) in a format that is conducive to a customer easily demonstrating PCI compliance to an auditor.

While there have been shown and described illustrative embodiments of a technique for implementing data policy deployed in a tag-based policy architecture of a virtualized computing environment, it is to be understood that various other adaptations and modifications may be made within the spirit and scope of the embodiments herein. For example, embodiments have been shown and described herein with relation to implementation of the data policy at the control plane and metavisors to specify the manner in which instances can access data stored on, e.g., volumes. However, the embodiments in their broader sense are not so limited, and may, in fact, allow for access to data stored on object stores. For such object storage, entire "buckets" of data may be encrypted using, e.g., Amazon Simple Storage Service (S3), wherein each bucket has an encryption key that is stored with the bucket and the encryption key is encrypted (wrapped) by the control plane (similar to a volume). Tags are applied to the buckets (similar to volumes), e.g., when a metavisor generates a key for a bucket, appropriate bucket tags to apply are determined based on the identity of the instance generating the key. When the metavisor requires decryption of the encryption key for the bucket, the control plane decrypts the key and allows access to the bucket based on the identity of the metavisor and the bucket tags bound to the key (similar to volume access). In an embodiment, the granularity of tagging and storage access may be improved and/or extended to the directory or even object level. That is, the logical construct "bucket" may be analogized to a volume with a bucket directory being similar to a file system directory and an object being similar to a file.

Advantageously, the technique described herein enables implementation of data policy in a tag-based policy architecture having an infrastructure that protects data stored on virtualized storage resources, such as disks organized as volumes. Illustratively, data policy information pertaining to instances having permission to access data of the volume (i.e., volume tags) is applied to the volume in a secure manner at distributed enforcement endpoints (e.g., the metavisors), while verification of such permission for the instances to access the data is determined by a centralized policy decision and enforcement endpoint (e.g., the control plane). The volume tags may be applied in a secure manner that is cryptographically strong by binding the tags to the data (via an encryption key) using an authentication tag. As a result, the technique allows the volume tags to follow the data in a manner that prevents tampering (or unauthorized access, such as unauthorized copying) of the tagged data, wherein the volume tags may be stored on and retrieved from the volume as open text obviating the need for costly hardware-based key-encryption, such as Trusted Platform Module (TPM), or software-based password schemes, such as challenge/response recovery, each of which may be defeated by sufficient tampering at a node. Notably, the control plane may evaluate the volume tags with the data policy to permit release of data encryption/decryption keys used by the metavisors to encrypt or decrypt data of the volumes on any CSP platform to thereby obviate control of the keys and data by the platform. The released keys enable the metavisors to provide fine-grain control with respect to rendering of decisions locally as to whether instances such as, e.g., the guest OS and associated applications, can access the data of a volume.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
generating a data encryption key for a volume attached to an intermediary manager coupled to a network of a computing environment;
computing volume metadata for the attached volume at a control plane coupled to the network, the volume metadata including volume tags associated with data stored on the attached volume;
encrypting the data encryption key using an authenticated encryption algorithm at the control plane, the authenticated encryption algorithm including the volume tags as additional data to cryptographically bind the volume tags to the encrypted data encryption key wherein encrypting the data encryption key comprises: generating an authentication tag using the authenticated encryption algorithm including the volume tags and the data encryption key; and
applying the volume tags to the attached volume in a secure manner by storing the encrypted data encryption key and the cryptographically bound volume tags on the attached volume.

2. The method of claim 1 further comprising:
sending a request for the volume metadata from the intermediary manager to the control plane, wherein the request includes a certificate with an extension containing a token with instance tags of the intermediary manager.

3. The method of claim 2 wherein computing the volume metadata further comprises:
processing the token and the instance tags with a data policy configured for the attached volume to compute the volume metadata.

4. The method of claim 3 further comprising:
returning a response from the control plane to the intermediary manager, wherein the response includes the token containing the volume tags of the computed volume metadata.

5. The method of claim 1 wherein applying the volume tags to the attached volume comprises:
writing the encrypted data encryption key, the volume tags, and the authentication tag to a label of the attached volume.

6. A method comprising:
receiving a request to decrypt a data encryption key for a volume that is encrypted at a control coupled to a network of a computing environment plane by generating an authentication tag using the authenticated encryption algorithm including the volume tags and the data encryption key, wherein the request includes the encrypted data encryption key, instance tags of a requesting instance of the computing environment, volume tags associated with data stored on the volume, and an authentication tag representative of cryptographic binding of the volume tags to the data encryption key;
providing the encrypted data encryption key, the volume tags, and the
authentication tag as input information to an authenticated encryption algorithm; and
performing a cryptographic operation on the information, as well as a check that the authentication tag is valid, to determine any tampering of the volume tags.

7. The method of claim 6 further comprising:
in response to determining there has not been any tampering, examining a data policy configured for the attached volume to determine whether the volume tags and the instance tags match the policy.

8. The method of claim 7 wherein examining the data policy further comprises:
verifying that the requesting instance associated with the instance tags can access the volume associated with the volume tags.

9. The method of claim 7 further comprising:
in response to determining that the volume tags and the instance tags match the policy, decrypting the encrypted data encryption key at the control plane.

10. A system comprising:
an intermediary manager of a first computer coupled to a network, the intermediary manager configured to generate a data encryption key for an attached volume; and
a control plane of a second computer coupled to the network, the control plane configured to compute volume metadata for the attached volume, wherein the volume metadata includes volume tags associated with data stored on the attached volume, the control plane further configured to receive the data encryption key from the intermediary manager and encrypt the data encryption key using an authenticated encryption algorithm including the volume tags as additional data to cryptographically bind the volume tags to the data encryption key, wherein volume tags are cryptographically bound to the data encryption key as an authentication tag generated from the authenticated encryption algorithm using the volume tags and the data encryption key, the control plane further configured to return the encrypted data encryption key to the intermediary manager for storage on the attached volume in a secure manner.

11. The system of claim 10 wherein the intermediary manager is further configured to send a volume metadata request for the volume metadata to the control plane, wherein the request includes a certificate with an extension containing a token with instance tags of the intermediary manager.

12. The system of claim 11 wherein the control plane is further configured to process the token and the instance tags with a data policy configured for the attached volume to compute the volume metadata.

13. The system of claim 10 wherein intermediary manager stores the encrypted data encryption key on the attached volume by writing the encrypted data encryption key to a label of the attached volume.

14. The system of claim 10 wherein the intermediary manager is further configured to send a key decryption request to decrypt the encrypted data encryption key to the control plane, wherein the request includes instance tags of a requesting instance, the encrypted data encryption key, the volume tags and the authentication tag.

15. The system of claim 14 wherein the control plane is further configured to provide the encrypted data encryption key, the volume tags and the authentication tag as input information to the authenticated encryption algorithm and perform a cryptographic operation on the information, as well as a check that the authentication tag is valid, to determine any tampering of the volume tags.

16. The system of claim 15 wherein the control plane is further configured to, in response to determining there has not been any tampering, examine a data policy configured for the attached volume to determine whether the volume tags and the instance tags match the policy.

17. The system of claim 16 wherein the control plane is further configured to, in response to determining that the volume tags and the instance tags match the policy, decrypt the encrypted data encryption key and return the decrypted data encryption key to the intermediary manager.

18. A non-transitory computer readable media containing instructions for execution on a processor for a method comprising:
generating a data encryption key for a volume attached to an intermediary manager coupled to a network of a computing environment;
computing volume metadata for the attached volume at a control plane coupled to the network, the volume metadata including volume tags associated with data stored on the attached volume;
encrypting the data encryption key using an authenticated encryption algorithm at the control plane, the authenticated encryption algorithm including the volume tags as additional data to cryptographically bind the volume tags to the encrypted data encryption key wherein encrypting the data encryption key comprises: generating an authentication tag using the authenticated encryption algorithm including the volume tags and the data encryption key; and
applying the volume tags to the attached volume in a secure manner by storing the encrypted data encryption key, the cryptographically bound volume tags, and the authentication tag on the attached volume.

19. The method of claim 18 further comprising:
sending a request for the volume metadata from the intermediary manager to the control plane, wherein the request includes a certificate with an extension containing a token with instance tags of the intermediary manager.

20. The method of claim 19 wherein computing the volume metadata further comprises:
   processing the token and the instance tags with a data policy configured for the attached volume to compute the volume metadata.

\* \* \* \* \*